United States Patent [19]

Abersfelder et al.

[11] Patent Number: 5,744,223
[45] Date of Patent: Apr. 28, 1998

[54] MARKING OF VEHICLES TO HINDER THEFT AND/OR UNAUTHORIZED SALE

[75] Inventors: Günter Abersfelder, Sindelfingen; Stefan Hahn, Denkendorf; Stefan Uhl, Stuttgart; Winfried Degen, Esslingen, all of Germany

[73] Assignee: Mercedes Benz AG, Germany

[21] Appl. No.: 324,476

[22] Filed: Oct. 17, 1994

[30] Foreign Application Priority Data

Oct. 16, 1993 [DE] Germany .................. 43 35 308.8

[51] Int. Cl.$^6$ .................................................. B32B 3/00
[52] U.S. Cl. .................. 428/206; 428/195; 428/212; 428/323; 428/327; 428/357
[58] Field of Search .................. 429/31, 67, 103, 429/143, 174, 187, 195, 199, 212, 221, 323, 327, 328, 338, 357, 402, 411.1, 372, 473.5, 476.6, 559, 478.2, 553, 692, 546, 606, 611, 694 B, 915, 923, 919, 928; 427/7, 261, 384, 385.5, 407.1, 917; 356/71; 283/70, 75, 76; 40/201; 428/31, 67, 103, 143, 174, 187, 195, 199, 212, 221, 323, 327, 328, 338, 357, 402, 411.1, 372, 473.5, 476.6, 559, 478.2, 553, 692, 546, 606, 611, 694 B, 915, 923, 919, 928

[56] References Cited

U.S. PATENT DOCUMENTS

| | | |
|---|---|---|
| 1,342,627 | 6/1920 | Green et al. . |
| 1,636,513 | 7/1927 | Hughes . |
| 3,861,886 | 1/1975 | Meloy . |
| 4,243,734 | 1/1981 | Dillon . |
| 4,368,979 | 1/1983 | Ruell ............................ 356/71 |
| 4,606,927 | 8/1986 | Jones . |
| 4,763,928 | 8/1988 | Krietemeier et al. ............. 283/70 |
| 4,767,205 | 8/1988 | Schwartz et al. ............... 356/71 |
| 5,083,814 | 1/1992 | Guinta et al. . |
| 5,360,628 | 11/1994 | Butland .......................... 427/7 |

FOREIGN PATENT DOCUMENTS

| | | |
|---|---|---|
| 0 040 839A3 | 12/1981 | European Pat. Off. . |
| 34 45 401A1 | 6/1986 | Germany . |
| 34 45 401 | 7/1986 | Germany . |
| 4-118689(A) | 4/1992 | Japan . |
| A-7-109856 | 4/1995 | Japan . |

OTHER PUBLICATIONS

European Search Report dated Feb. 6, 1995.

*Primary Examiner*—William Krynski
*Attorney, Agent, or Firm*—Evenson, McKeown, Edwards & Lenahan, P.L.L.C.

[57] ABSTRACT

In an arrangement for marking of vehicles to hinder theft or unauthorized sale, the marking permanently applied to the vehicle comprises a multiplicity of microscopic information carriers having data (secondary information) encoded thereon which data normally coincides with information providing details on the identity of the vehicle (primary information) stored in some other way and not accessible to manipulation. Many thousands of information carriers encoded with the secondary information are incorporated in the manner of pigments into a vehicle coating, at least at certain locations.

7 Claims, 2 Drawing Sheets

MARKING OF VEHICLES TO HINDER THEFT AND/OR UNAUTHORIZED SALE

BACKGROUND AND SUMMARY OF THE INVENTION

The invention relates to a method for marking of vehicles to hinder theft or unauthorized sale.

A marking of the generic type is known from German patent document DE-OS 34 45 401. The marking is applied to the vehicle underneath a coat of lacquer, paint or underseal and reflects incident radiation of a certain wavelength. The marking is designed as a bar code which extends over the vehicle in the direction of its longitudinal axis and in which vehicle data are encoded. With suitable radiation transmitters and receivers, vehicles can be sensed even during driving and, for checking the vehicle identity, can be compared with specific vehicle data stored such that they are immune to falsification. Thus, the risk of theft can be reduced on account of the easier locatability of the vehicle for authorized persons.

For a car thief, however, making this marking more difficult to detect by concealing it behind coatings no longer presents any obstacle, with the current skill level of the people concerned, on account of the means available. Although the effort involved in changing the identification is high, it is accepted all the more the higher the profit which can be achieved with the vehicle when sold.

In addition, when the body is damaged even slightly, it very difficult to read satisfactorily the bar code applied on it, so that the driver would be suspected of theft in a vehicle check without having committed a crime. Furthermore, when the damage is rectified, reapplying the same or a new bar code can be carried out only with great technical complexity, financial outlay and administrative effort for the vehicle owner.

The object of the present invention, therefore, is to provide a generic marking which reliably protects against falsification of the vehicle identity at all times.

The object is achieved according to the invention by encoding vehicle identifying information, in microscopically small size, on a large number of microfine information carriers, which are mixed into a surface coating of the vehicle.

Thanks to the invention, in spite of recoating, the microfine formation of the information carriers and their mass distribution in a vehicle coating mean that there still remain on the vehicle enough locations with data which can reproduce the original identity. Consequently, when checking the vehicle in a vehicle check, the likelihood of detecting unauthorized use or unlawful ownership on the basis of the verifiable detectability of a deviation of such secondary information from primary information recorded elsewhere, is relatively high.

By virtue of the high technological requirements and prerequisites for producing the information carriers and the resulting more difficult imitation, the marking according to the invention offers additional protection against falsification. If cheaper, technologically inferior means are used for imitation, deviations in the formation of the information carriers and their application occur, which can be detected as manipulations of the original identity.

If the use of such a marking becomes known, it may help to deter any changing of the identity of the vehicles provided with the marking, so that altogether protection against falsification of identity and consequently protection against theft or unauthorized sale which is reliable at all times is achieved. For vehicles at the high or highest price level, which are no longer given fully comprehensive insurance owing to the high risk of theft, with such a falsification-proof marking insurance agreements can again be considered by insurers.

Furthermore, the marking according to the invention prevents hit-and-run accidents in which residual traces of scraped off paint of the vehicle remain at the scene of the accident, since the probability of detection is very high. If this fact is generally known by the public, it may have the consequence that drivers adopt a defensive and more cautious style of driving, and then the number of accidents is reduced.

Other objects, advantages and novel features of the present invention will become apparent from the following detailed description of the invention when considered in conjunction with the accompanying drawings.

DETAILED DESCRIPTION OF THE DRAWINGS

Figure 1:
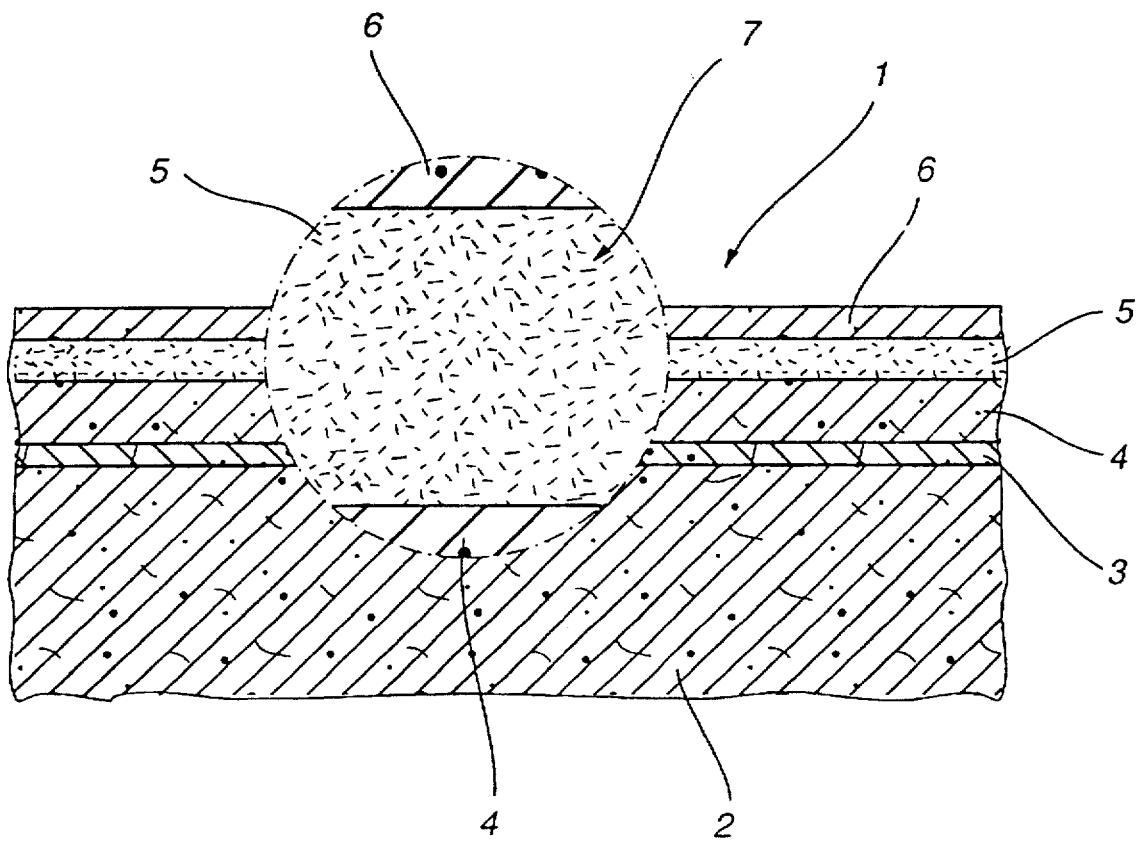
FIG. 1 is a sectional representation of a portion of an outer skin of a vehicle body with an enlarged cutout of the marking according to the invention.

FIG. 1 shows a portion of a vehicle outer skin 1, which is composed of a metal vehicle panel 2 and a plurality of coatings applied to the metal vehicle panel 2—in addition to a phosphating coat 3 and a priming coat 4. Only two such additional coatings are illustrated here by way of example, a filler coating 5 and a top coating 6.

Incorporated in the filler coating 5 in the manner of pigments are many thousands of identical platelets 7 which are microscopically small. In particular, such platelets may range in size from 5 to 100 µm (preferably 10 µm), with a thickness of from 1 to 5 µm (preferably 2 µm). A concentration of platelets which is in the range of 0.5–5.0 ppm is preferred, such concentration being sufficient to assure that at least one platelet can be found in a paint sample, without extensive searching.

The platelets 7 serve as information carriers for secondary information, containing characteristic numerically coded features of the vehicle, such as for example the chassis number 8 or numbers for certain accessories. The platelets 7 are formed as embossed sections of a thin aluminum foil 12 and are distributed over the entire outer skin 1 of the vehicle. They may also be localized in particular locations, only authorized persons being allowed to know their position.

Furthermore, the platelets 7 may also be incorporated in the inner coating, in the top coating, in the underseal compound and/or the protective wax coating which is applied to preserve hollow members of the vehicle. Due to their large quantity and their tiny size, the microplatelets 7 are virtually unremovable in their entirety, so that consequently a falsification-proof marking of vehicles which hinders theft, unauthorized sale and unlawful possession is obtained.

If a coating sample is taken in a vehicle check, the information embossed into the platelets 7 (which is visible under a microscope) is compared with information (primary information) on the identity of the vehicle, stored in a central traffic register. If the secondary information deviates from the primary information, there is then the suspicion of unlawful vehicle ownership.

Figure 2A:
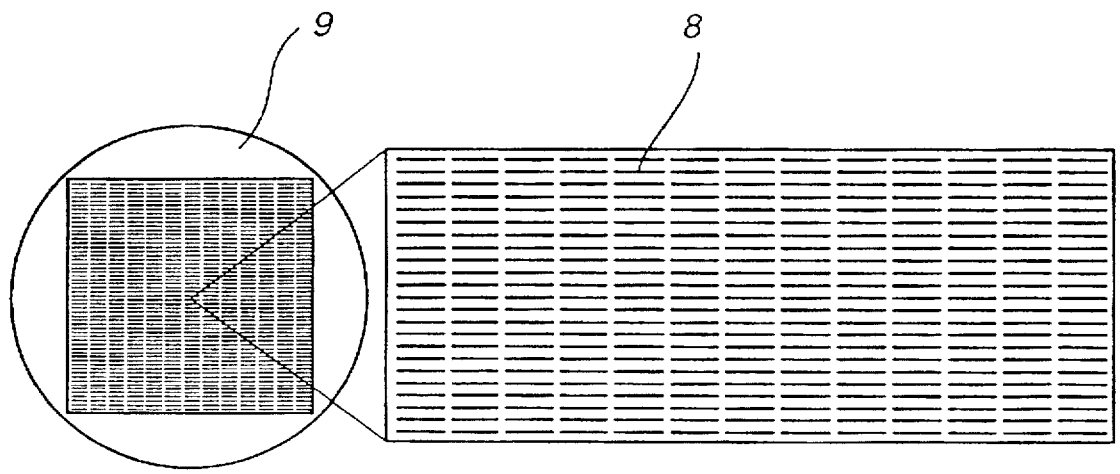
FIGS. 2a–d show in symbolic representation four major process steps for the marking according to the invention.
Figure 2B:
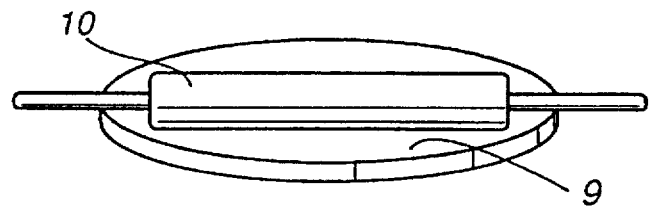
Figure 2C:
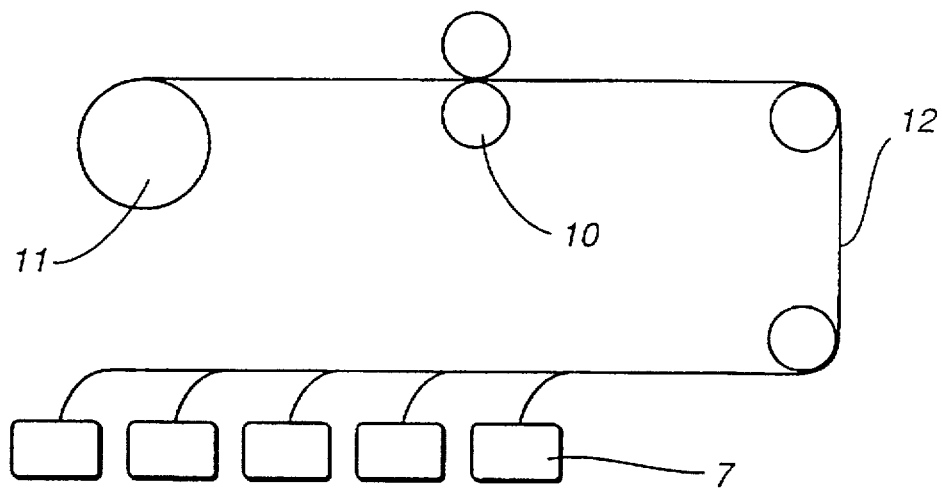
Figure 2D:
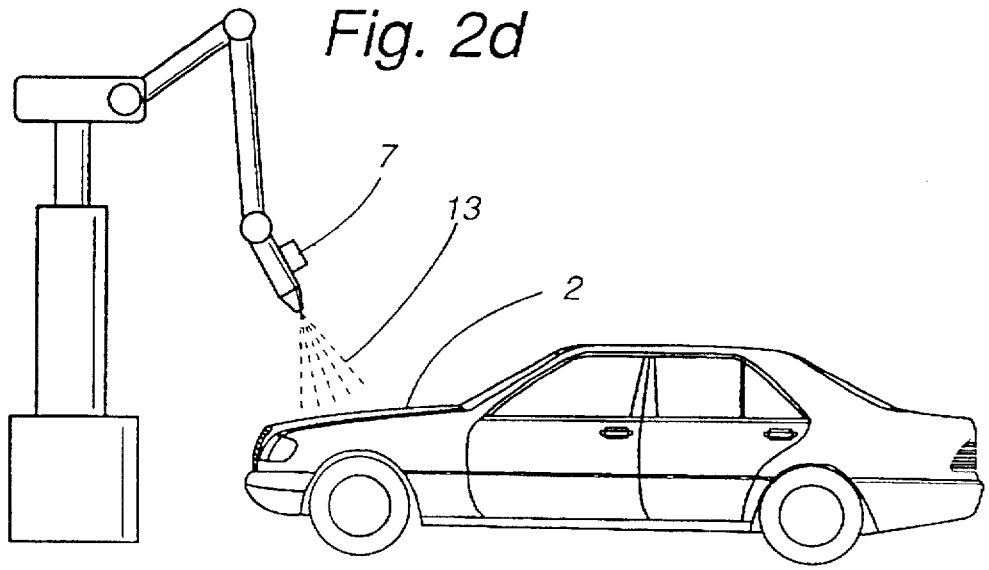

For production of the microfine information carriers 7, according to FIG. 2a, first multiple copies of the same chassis numbers 8 are written in a microscopically small size onto a silicon wafer 9 by an electron beam. The script of the wafer 9 is then transferred onto an embossing roller 10 (FIG. 2b), by means of which an aluminum foil 12, which can be unwound from a coil 11, is hot-embossed (FIG. 2c). Subsequently, the foil 12 is cut into microplatelets 7, which are mixed in with the coating 13 during the coating operation (FIG. 2d). It is also possible to apply the microplatelets 7 in a separate operation following coating. The information stored on the microplatelets concerning the identity of the vehicle can be retrieved by means of a magnifying glass or a microscope. The microscopic characters can also be applied by an etching process, as is customary in the production of semiconductor masks.

As an alternative to the type of information storage on platelets described above, it is also possible to utilize photochromic color molecules, which color by irradiating with UV light. Arrangement of colored and uncolored molecules in a particular sequence makes it possible to represent secondary information. The coloration sequence of the molecules defines a code, the unauthorized decoding of which is possible—if at all—only with extreme effort, which virtually rules out any falsification of the identity of the vehicle. The molecules may, moreover, be applied to polymer platelets which, due to their lack of metallic reflection, may also be mixed in with other coatings as metallic coatings without disturbing the subjective color appearance of the coating.

Furthermore, the polymer platelets may also be coated with magnetically aligned particles in series next to one another, with the alignment sequence containing the secondary information in the form of a code. For production, a polymer film of a large area is coated with magnetic single-domain particles. The coated carrier material is subsequently heated locally by a laser and at the same time exposed to a magnetic field, which causes the magnetic particles to become rotatable and align themselves in each case parallel to the direction of the applied magnetic field. (Without a field, the particles align themselves randomly, so that no macroscopic magnetization occurs.) By repeatedly switching off the magnetic field, a magnetic bit pattern can be produced along a heating zone on the carrier material, so that the pattern forms a track. In this embodiment, every track has associated in its direct vicinity a reference track, which serves for unambiguity of signal recognition in a detection of the secondary information, since undesired changes of direction of already aligned particles can occur, specifically in regions of polarity reversal. After cooling (and consequent setting) of the carrier material, the aligned particles are as it were "frozen in", i.e., no longer rotatable. The foil is then reduced to microfine platelets and added in with the coating. Here too, in a way similar to the application of photochromic molecules, unauthorized decoding cannot take place in practice on account of the high storage density and the consequently virtually unlimited coding possibilities.

As a further embodiment, the platelets 7 may be formed as small pieces of a monochromatic hologram of a large area, just a few atomic positions thick and in which the secondary information is recorded by known holographic techniques. In spite of the separation of the foil into pieces, each small piece has in itself all the information stored in the entire foil. The holographic method of information storage requires a comparatively low production outlay. On account of their colorlessness in the visible spectral range, photochemical, transparent polymer films or film pieces with infrared or UV holograms can be incorporated in the varnish coating without changing the color of the coating, so that in a vehicle check the secondary information can be read directly simply by irradiating with the reference laser light used during recording.

Finally, the information carriers may also be peptide chains, which are composed of a plurality of identical and/or mutually different amino acids or amino acid derivatives and may be mixed in with the varnish or some other vehicle coating. By varying the type of amino acid and its position in the peptide chain during production and by the simultaneous use of different peptide chains, a storage of an adequate number of items of secondary information for unambiguous recognition of the identity of the vehicle is possible. A decoding of the sequence of the peptide chain components in the various peptide chains is nonetheless in this case possible only with great difficulty without the code key, on account of the wide variety of possibilities. Thus, very high security against falsification is obtained for the vehicle, once again without discoloration of the coating.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for preventing theft of a vehicle comprising:

microscopic information carriers having dimensions in the range of microns, each of said information carriers being encoded with identifying secondary information concerning the vehicle, said information carriers being contained in a vehicle coating of said vehicle at least at selected locations, said vehicle coating being selected from the group consisting of a top coating paint, an inner coating paint, an underseal coating and a protective wax coating;

whereby said secondary information encoded on said information carriers may be detected and compared with stored primary information concerning said vehicle to detect alteration of said secondary information.

2. Arrangement according to claim 1 wherein said information carriers are present in said vehicle coating in a concentration which is in the range of 0.5 to 5.0 parts per million.

3. Arrangement according to claim 1 wherein the information carriers are platelets.

4. Arrangement according to claim 3 wherein the platelets are formed as embossed sections of an aluminum foil.

5. Arrangement according to claim 3 wherein on the platelets there is applied a sequence photochromic color molecules having a coloration sequence, from which the secondary information can be read.

6. Arrangement according to claim 3 wherein the platelets are pieces of a hologram in which the secondary information is recorded.

7. Arrangement according to claim 3 wherein the platelets are in each case coded with magnetic particles in series next to one another, each of said particles having a magnetic polarity which can be aligned in at least a first and a second orientation, whereby a plurality of said particles in series form an alignment sequence from which the secondary information can be read.

* * * * *